March 15, 1932.  J. H. McEVOY, JR., ET AL  1,849,374
PIPE SUPPORTING MEANS
Filed Feb. 3, 1930  2 Sheets-Sheet 2
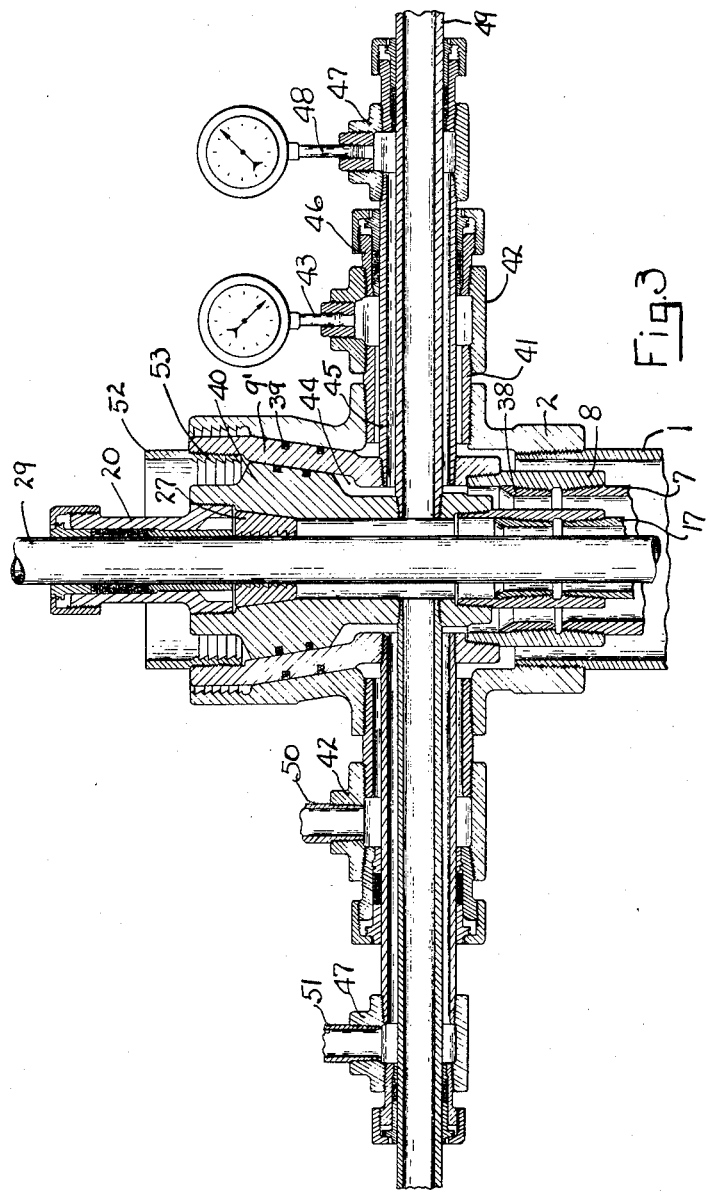
JOSEPH H McEVOY Jr.
&
EDWIN A. JOHNSON
INVENTORS
BY Jesse R. Stone
& Lester B. Clark
ATTORNEYS Patented Mar. 15, 1932

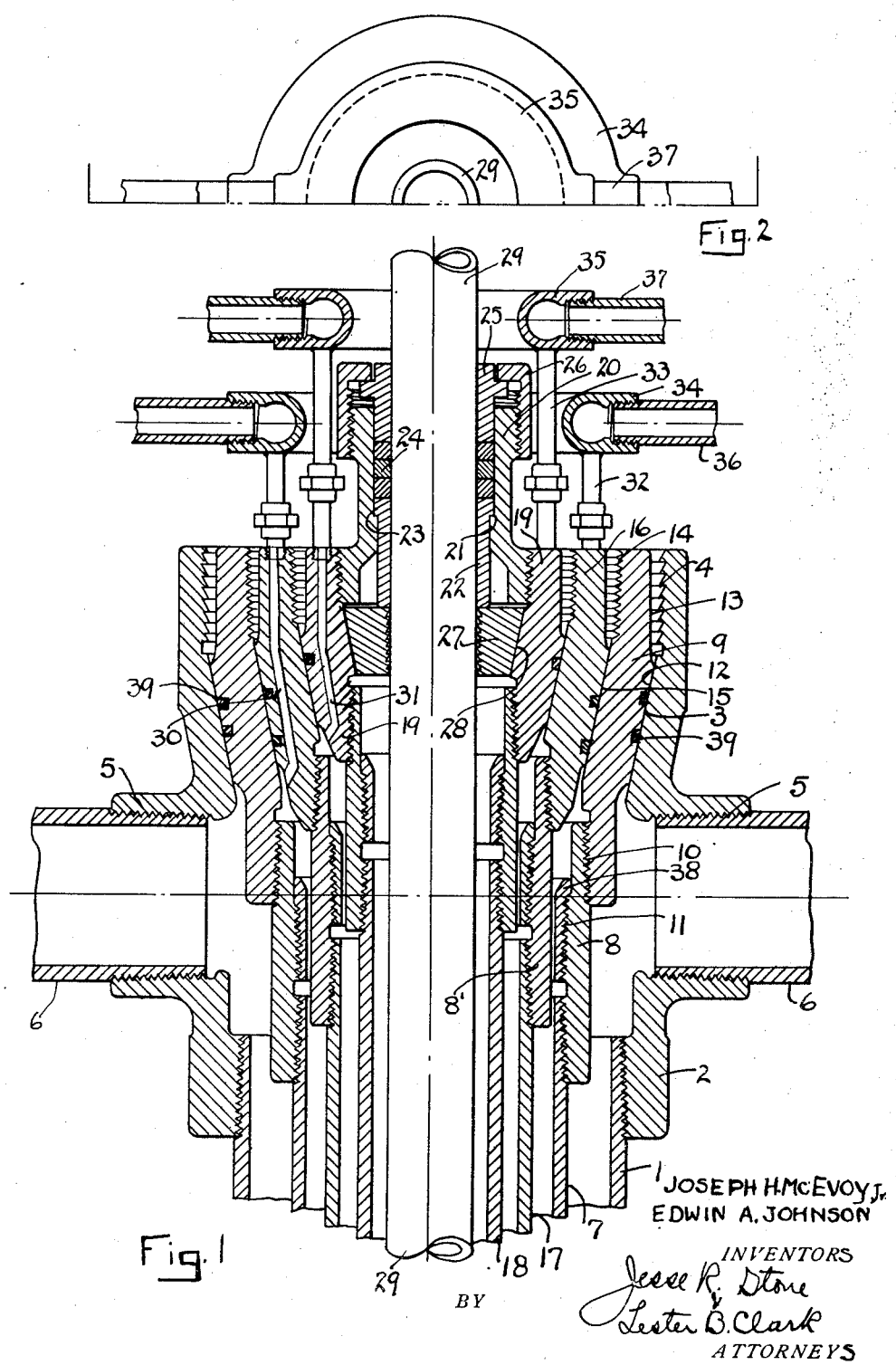

1,849,374

UNITED STATES PATENT OFFICE

JOSEPH H. McEVOY, JR., AND EDWIN A. JOHNSON, OF HOUSTON, TEXAS

PIPE SUPPORTING MEANS

Application filed February 3, 1930. Serial No. 425,626.

Our invention relates to equipment to be used in the casing heads of wells and has particular relation to devices employed therein for suspending pipe in wells.

In the operation of handling deep wells in the production of oil, gas, sulphur and the like it is frequently necessary to suspend a plurality of strings of pipe from the upper end of the well. Various means have been devised for connecting the upper ends of the concentrically arranged strings of pipe so that they may be assembled or disassembled and connected together in such manner that they will be held properly centered in the well. Most of these prior devices, however, are difficult to properly connect together and they may not be easily disassembled or connected in the operation of the well.

It is an object of our invention to provide means for suspending a plurality of strings of pipe in the well and to form a fluid tight engagement between the upper ends of said pipes.

It is also an object to provide means for allowing the passage of gas or other fluid from the space between the adjacent strings of pipe.

It is desired to provide a means of allowing the escape of fluid from between various pipe strings and to provide a passage from the well to some place of storage for said fluid.

Another object is to provide a connection on each string for a hold down ring or blow out preventer.

Referring to the drawings herewith, Fig. 1 is a central vertical section through the upper end of a deep well equipment showing a casing head and a plurality of strings of pipe suspended therein.

Fig. 2 is a top plan view of one-half of the upper end of the assembly shown in Fig. 1.

Fig. 3 is a view similar to that shown in Fig. 1 but illustrating a different arrangement of the outlets from between the various strings of pipe.

Referring to the structure disclosed in Fig. 1, I have shown an outer casing 1 of the usual type. This casing extends from the surface of the ground downwardly for a suitable distance and sustains the wall of the upper portion of the well. It is provided with a casing head 2, the lower end of which is screwed to the upper end of the casing and the upper end of which is flared slightly outward to provide a tapered inner seat 3 to receive pipe-engaging slips, or, as in the present case, may serve as a supporting surface for adjacent inner strings of pipe. The inner face of the upper end of the casing head is provided with downwardly inclined ratchet teeth or threads 4 for engagement with a latching mechanism or with a device such as a blowout preventer ring or hold down ring or with any device which may be screwed therein. The casing head may have two or more laterally opening outlets 5, to which are connected fluid-conducting pipes 6.

Within the upper end of the casing head we may support an inner string of pipe indicated at 7. This pipe is connected by means of a coupling 8 to a bushing 9. As will be noted the coupling 8 is threaded internally to engage the pipe 7 and externally at its upper end 10 to engage the bushing 9. It is also threaded on its inner face at 11 for connection with a section of pipe to be employed in raising the string 7.

The bushing 9 is tapered on its outer face at 12 to fit within the seat 3 in the casing head. The upper end of the bushing is of slightly smaller external diameter at 13 so as to be spaced slightly from the threaded surface 4 in the casing head. On its inner face the bushing 9 is threaded at 14 at the upper end and is tapered downwardly at 15 to form a seat for the next inner bushing 16 for supporting another string of pipe.

There may be one or more strings of pipe inside the string 7. I have shown a string 17 and a string 18, each of which are constructed as is the string 7 and connected with the bushings 16 and 19, as will be seen in the drawings. The inner bushing 19 is connected with a stuffing box 20, which extends above the casing head and has an internal shoulder 21 to receive a sleeve 22, which fits within the stuffing box and has a slight flange 23 at its upper end to engage the shoulder 21. Above the sleeve 22 the packing rings 24 are held in place by a gland 25 operated through an outer threaded sleeve 26. This is of ordinary construction of stuffing box and need not be further described.

The lower end of the sleeve 22 is adapted to bear against a set of pipe engaging slips 27. These slips fit within the tapered seat 28 of the bushing 19 and serve to grip the stem or tube 29 and hold the same supported within the well.

To form a connection at the upper end with the spaces between the adjacent strings of pipe it is desired to form within the bushings 16 and 19 upwardly extending passages 30 in the bushing 16, and 31 in the bushing 19. These passages are drilled upwardly through the bushing and the open upper end of the passage is connected to outlet pipes 32 and 33 leading to ring-shaped manifolds 34 and 35, respectively. These manifolds are circular pipes provided at opposite sides with laterally extending branches 36 and 37, respectively. These branches serve to conduct oil, gas or other fluid from the space between the pipes where the same is forced upwardly under pressure.

In assembling this device the first outer string within the casing head shown at 7 is set in the well and is usually cemented in place at the lower end. The pipe sags somewhat in the well and it is necessary to engage the upper end of the string 7 and draw it upwardly into a taut position so that the bushing 9 may be screwed to the coupling 8. To do this a section of pipe or a special tool threaded for that purpose may be engaged within the threaded section 11 of the coupling. An upward pull is then exerted through the lines connected to the hoisting drum and the coupling 8 and the section 7 to which it is attached is drawn upwardly into the position shown in the drawings. The bushing 9 is then screwed down tightly over the upper end of the coupling and then the weight of the pipe 7 may be released and the bushing 9 will be drawn tightly into its seat. The pipe employed in raising the string 7 may then be disconnected from the threaded portion of the coupling and a collar 38 may be screwed in place of the section of pipe used in raising the string, said collar acting to protect the threads of the coupling from mutilation in further handling. This is done in connection with each of the subsequent strings of pipe as they are connected to their respective bushings. When the device is completely assembled, as shown in Fig. 1, there will be a downward tension on the different bushings which will tend to hold them firmly connected to the adjacent bushings. We may set packing rings 39 in the outer faces of each of the bushings 9, 16 and 19 so as to assist in forming a fluid tight seal between the separate strings at their upper ends.

In Fig. 3 I have shown a slightly different embodiment of the invention. The casing 1 in this case is connected to the casing head 2 in the same manner as in the first embodiment and the bushing 9' is seated within the casing head in the same manner as was previously described. I have shown but two strings of pipe within the outer casing 1, the inner section being connected with a bushing 40 of heavier construction which is engaged with a stuffing box 20 similar in construction to the stuffing box employed in the first embodiment. The pipe-engaging slips 27 are held in place by the stuffing box as in the embodiment first described.

The particular change in this construction over that shown in Figs. 1 and 2 lies in the manner of connecting the spaces between the adjacent strings of pipe with some place of storage or to the atmosphere through lateral branching pipes taking the place of the pipes 32 and 33 with the assembled equipment. In this embodiment the casing head 2 is connected by means of a nipple 41 to a coupling 42 within which a pressure gauge 43 is connected. The space 44 between the inner sections 7 and 17 is provided with an outlet through a pipe 45 connected with the bushing 9 and extending outwardly concentric with the pipe 41 in the casing head. This pipe 45 extends through a stuffing box 46 connected with a coupling 42 and has screwed thereon a coupling or T 47 to which is connected a pressure gauge 48.

The inner bushing 40 is similarly connected to a pipe 49 leading laterally from the casing head. This pipe is intended to connect the interior of the well through the pipe 17 with a place of storage of fluid.

On the opposite side of the casing head a similar series of connections is made. The couplings 42 and 47 on the opposite side, however, are connected with outlet pipes 50 and 51, respectively, these pipes leading to any desired place of storage or to waste as desired.

In this embodiment I have shown the threaded upper end of the bushing 9' as connected with a thimble 52 screwed therein and projecting slightly above the casing head. The inner lower face of this thimble is provided with ratchet threads 53 similar to those on the inner end of the casing head.

The operation of this form of casing head and its method of assembly is similar to the embodiment shown in Fig. 1. However, in assembling the device when the bushings 9' and 40 are connected to the upper ends of their respective strings of pipe and the elevating apparatus is then connected with the couplings 8 and 8', the pipes 45 and 49 are screwed in position laterally so that they will be properly positioned concentric with each other as shown.

In handling a well equipped with my invention, such as may be necessary in pumping operations, there is frequent occasion to prevent the escape of fluid under pressure at the upper end of the well and with the structures assembled as provided for in this device the upper ends of the pipes are sealed against accidental escape of gas or liquid and the separate pipes are each provided with outlets through which fluid may be conducted without danger to the structure and without the loss of time. While pressure gauges are not shown in the Fig. 1 embodiment it is to be understood that they may be connected to pipes 33 and 36 in an obvious manner and will provide the operator of the well with means whereby he can note whether the fluid pressure in the separate lines is becoming excessive and may take such steps as is necessary to provide for the relief of the pressure.

Our device is particularly advantageous because of its simplicity and the ease with which it may be assembled and also from the compact arrangement of the supporting means for each string of pipe a seal between adjacent pipes is provided which will stand up under heavy pressures and little difficulty will be encountered in the operation of the device.

In Figs. 1 and 3 the pipe 29 may be a well tubing thru which the liquid or gas may be taken from the well. This pipe is supported by the slips 27 and the seal between the inner string 18 and the tubing is formed by the stuffing box 20. The tubing may be removed by removing the stuffing box and the slips in an obvious manner.

It will be seen that we are enabled to support each string of pipe as it is set and that the tapered inner seat in each bushing forms a bowl to receive pipe engaging slips as the drilling proceeds. When the well is finished the bushings nest together to form a gravity operated seal to prevent escape of gas or oil from the different strings. In addition to gravity, nuts, hold down rings or blowout rings may be placed in any one or all of the several casing heads or the bushings. The device is simple and compact and convenient to install.

What we claim as new is:

1. A pipe assembly for wells including a casing, a casing head thereon, an inner tapered seat in said casing head, a plurality of concentric strings of pipe in said casing, and a bushing on each string, the outer one of which is formed to fit said tapered seat, and each inner bushing is flush with the upper end of said casing head and formed to nest within the next outer one to form a seal at the upper ends of adjacent strings of pipe, and support said strings in the well.

2. A pipe assembly for wells including a casing, a casing head thereon, an inner tapered seat in said casing head, a plurality of concentric strings of pipe in said casing, and a bushing on each string, the outer one of which is formed to fit said tapered seat, and each inner bushing is tapered downwardly to fit within the next outer one, said bushings all being enclosed within said casing head, the outermost of said bushings being adapted to engage within and be supported in said casing head seat.

3. A pipe assembly for wells including a casing, a casing head thereon, an inner tapered seat in said casing head, a plurality of concentric strings of pipe in said casing, and a bushing on each string, the outer one of which is formed to fit said tapered seat, and each inner bushing is shaped to interfit with and be supported by the next outer one, all of said strings being supported in said seat with their upper ends flush with said casing head.

4. A casing, a casing head thereon having an inner downwardly tapered seat, a plurality of inner tapered bushings nesting, each within the next outer one to form a seal therewith, the said bushings being supported in said seat and flush with the upper end of said casing head, strings of pipe on said bushings, and outlets on said bushings.

5. A casing, a casing head thereon having an inner downwardly tapered seat, a plurality of inner tapered bushings nesting, each within the next outer one and enclosed about thereby to form a seal therewith, the said bushings being supported in said seat, couplings on said bushings and strings of pipe on said coupling, said couplings being threaded to engage a lifting device for the purpose stated.

In testimony whereof we hereunto affix our signatures this 27th day of January, A. D. 1930.

JOSEPH H. McEVOY, Jr.
EDWIN A. JOHNSON.